United States Patent
Clark

(10) Patent No.: US 11,926,345 B2
(45) Date of Patent: Mar. 12, 2024

(54) AUTONOMOUS VEHICLES SUPPORTING GLOBAL NAVIGATION SATELLITE SYSTEM (GNSS) ANTI-SPOOFING

(71) Applicant: Raytheon Systems Limited, Harlow (GB)

(72) Inventor: Steven Clark, Harlow (GB)

(73) Assignee: Raytheon Systems Limited, Harlow (GB)

( * ) Notice: Subject to any disclaimer, the term of this patent is extended or adjusted under 35 U.S.C. 154(b) by 664 days.

(21) Appl. No.: 16/918,934

(22) Filed: Jul. 1, 2020

(65) Prior Publication Data
US 2021/0001896 A1   Jan. 7, 2021

(30) Foreign Application Priority Data

Jul. 3, 2019   (GB) ...................................... 1909576

(51) Int. Cl.
*G01S 19/00*   (2010.01)
*B60W 60/00*   (2020.01)
(Continued)

(52) U.S. Cl.
CPC ..... *B60W 60/00188* (2020.02); *G01S 19/015* (2013.01); *G01S 19/243* (2013.01); *G01S 19/37* (2013.01)

(58) Field of Classification Search
CPC ............ B60W 60/00188; G01S 19/015; G01S 19/243; G01S 19/37; G01S 3/48; G01S 3/50; G01S 19/36; G01S 19/215
See application file for complete search history.

(56) References Cited

U.S. PATENT DOCUMENTS

| 5,694,416 A | 12/1997 | Johnson | |
| 6,618,006 B1 * | 9/2003 | Syrjarinne | G01S 19/39 |
| | | | 342/357.65 |

(Continued)

FOREIGN PATENT DOCUMENTS

| EP | 2662706 A1 | 11/2013 |
| EP | 3428688 A1 | 1/2019 |

(Continued)

OTHER PUBLICATIONS

Non-Final Office Action dated Sep. 8, 2021 in connection with U.S. Appl. No. 16/918,860, 11 pages.

(Continued)

*Primary Examiner* — Adam R Mott
*Assistant Examiner* — Shaheda Shabnam Hoque

(57) ABSTRACT

A system includes a vehicle and a vehicle control system configured to autonomously control one or more operations of the vehicle. The system also includes a navigation receiver configured to identify a location of the vehicle and to provide the identified location to the vehicle control system. To identify the location of the vehicle, the navigation receiver is configured to identify whether navigation signals received by the navigation receiver are spoofed based on angles of arrival for the navigation signals and to suppress any of the navigation signals determined to be spoofed. The navigation receiver may be configured to suppress any of the navigation signals determined to be spoofed in order to prevent an illicit actor from misdirecting the vehicle to an undesired location and/or to prevent an illicit actor from causing the vehicle to make course corrections based on an incorrect current location of the vehicle.

20 Claims, 7 Drawing Sheets

(51) Int. Cl.
  *G01S 19/01* (2010.01)
  *G01S 19/24* (2010.01)
  *G01S 19/37* (2010.01)

(56) References Cited

U.S. PATENT DOCUMENTS

| | | | |
|---|---|---|---|
| 6,750,816 B1 | 6/2004 | Kunysz | |
| 6,961,017 B1 | 11/2005 | Naylor et al. | |
| 7,250,903 B1 | 7/2007 | McDowell | |
| 7,304,605 B2 | 12/2007 | Wells | |
| 7,494,090 B2 | 2/2009 | Leal et al. | |
| 7,952,519 B1 | 5/2011 | Nielsen et al. | |
| 8,825,399 B2 | 9/2014 | Vance | |
| 9,725,171 B1 | 8/2017 | Carmack et al. | |
| 9,910,160 B2* | 3/2018 | Geren | H04K 3/90 |
| 9,952,325 B2 | 4/2018 | Fernandez-Hernandez | |
| 10,024,973 B1 | 7/2018 | Alexander et al. | |
| 10,031,234 B1 | 7/2018 | Alexander | |
| 10,081,416 B2 | 9/2018 | Elder | |
| 10,162,060 B2 | 12/2018 | Jaeckle | |
| 10,234,564 B2* | 3/2019 | Whitehead | G01S 19/215 |
| 10,725,182 B2 | 7/2020 | Boyer et al. | |
| 11,119,221 B2 | 9/2021 | Cohen et al. | |
| 11,313,973 B2* | 4/2022 | Molina-Markham | G01S 19/215 |
| 2001/0008393 A1* | 7/2001 | Valio | G01S 5/0045 342/357.42 |
| 2012/0286994 A1 | 11/2012 | Letestu et al. | |
| 2013/0090078 A1 | 4/2013 | Martin et al. | |
| 2013/0162470 A1 | 6/2013 | Rousu et al. | |
| 2014/0266882 A1 | 9/2014 | Metzger | |
| 2014/0292576 A1 | 10/2014 | Martin et al. | |
| 2015/0116147 A1* | 4/2015 | Jaeckle | G01S 19/015 342/357.59 |
| 2015/0123846 A1 | 5/2015 | Jeong et al. | |
| 2016/0146944 A1 | 5/2016 | Geren et al. | |
| 2017/0227650 A1* | 8/2017 | Grobert | H04K 3/65 |
| 2017/0261619 A1 | 9/2017 | Klein | |
| 2018/0196141 A1 | 7/2018 | Dickerson et al. | |
| 2018/0231982 A1* | 8/2018 | Yunoki | G05D 1/0217 |
| 2018/0321682 A1* | 11/2018 | Matsumoto | G05D 1/0278 |
| 2018/0341266 A1* | 11/2018 | Morimura | G05D 1/0276 |
| 2018/0356234 A1 | 12/2018 | Wilby et al. | |
| 2019/0033465 A1* | 1/2019 | Kido | G01S 19/40 |
| 2019/0039618 A1* | 2/2019 | Mori | B60W 50/082 |
| 2019/0145776 A1* | 5/2019 | Yang | G01C 21/005 702/150 |
| 2019/0154842 A1* | 5/2019 | Adachi | G01C 21/36 |
| 2019/0317221 A1* | 10/2019 | Molina-Markham | G01S 19/215 |

FOREIGN PATENT DOCUMENTS

| | | |
|---|---|---|
| GB | 2534654 A | 8/2016 |
| WO | 2015142985 A1 | 9/2015 |
| WO | 2016034623 A1 | 3/2016 |

OTHER PUBLICATIONS

Lo et al., "Robust GNSS Spoof Detection using Direction of Arrival: Methods and Practice," Proceedings of the 31st International Technical Meeting of the Satellite Division of the Institute of Navigation, Oct. 2018, 16 pages.

Humphreys et al., "Assessing the Spoofing Threat—GPS World," GPS World, Jan. 2009, 41 pages.

Raytheon Co., "Innovation for New Markets, " Raytheon UKnews, Spring 2014, 12 pages.

Raytheon Co., "Landshield GPS Anti-Jam Antenna," Specification Sheet, Mar. 2019, 1 page.

U.S. Appl. No. 16/918,860 entitled "Global Navigation Satellite System (GNSS) Anti-Spoofing Techniques" filed Jul. 1, 2020, 46 pages.

Non-Final Office Action dated Apr. 7, 2022 in connection with U.S. Appl. No. 16/918,860, 17 pages.

"Global Positioning System Standard Positioning Service Signal Specification," GPS Navstar Global Positioning System, 2nd Edition, Jun. 1995, 51 pages.

Final Office Action dated Dec. 27, 2021 in connection with U.S. Appl. No. 16/918,860, 14 pages.

Combined Search and Examination Report in connection with UK Patent Application No. GB1914762.8 dated Apr. 14, 2020, 9 pages.

Search and Examination Report in connection with UK Patent Application No. GB 1909572.8 dated Aug. 31, 2021, 6 pages.

Examination Report in connection with UK Patent Application No. GB 1909576.9 dated Oct. 20, 2021, 4 pages.

Non-Final Office Action in connection with U.S. Appl. No. 17/066,106 dated Oct. 25, 2021, 12 pages.

Combined Search and Examination Report in connection with UK Patent Application No. GB1909572.8 dated Dec. 5, 2019, 8 pages.

Combined Search and Examination Report in connection with UK Patent Application No. GB1909576.9 dated Dec. 4, 2019, 7 pages.

U.S. Appl. No. 17/066,106 entitled "Global Navigation Satellite System (GNSS) Anti-Spoofing Technologies Based on Similarities of Gain Vectors" filed Oct. 8, 2020, 47 pages.

Examination Report dated Mar. 22, 2023 in connection with United Kingdom Patent Application No. GB1909572.8, 4 pages.

Combined Search and Examination Report dated May 16, 2023 in connection with UK Patent Application No. GB2212555.3, 5 pages.

* cited by examiner

AUTONOMOUS VEHICLES SUPPORTING GLOBAL NAVIGATION SATELLITE SYSTEM (GNSS) ANTI-SPOOFING

CROSS-REFERENCE TO RELATED APPLICATION AND PRIORITY CLAIM

This application claims priority under 35 U.S.C. § 119 to United Kingdom Patent Application No. 1909576.9 filed on Jul. 3, 2019, which is hereby incorporated by reference in its entirety.

TECHNICAL FIELD

This disclosure relates generally to autonomous vehicles. More specifically, this disclosure relates to autonomous vehicles supporting global navigation satellite system (GNSS) anti-spoofing.

BACKGROUND

A global navigation satellite system (GNSS) uses satellites to support geo-spatial positioning. A GNSS receiver typically receives signals from multiple GNSS satellites and uses known positions of the GNSS satellites to calculate a position of the receiver. One example of a GNSS system is the Global Positioning System (GPS), which uses a constellation of satellites that continuously transmit their current positions and their current times as held by atomic clocks on-board the satellites. A GPS receiver monitors the signals from multiple GPS satellites and uses the positions and times transmitted by the satellites to determine its position. Typically, a minimum of four signals from four GPS satellites need to be received in order to calculate the position of a GPS receiver in three-dimensional space and to correct for deviation of the receiver's internal clock from the satellites' clocks.

Global navigation satellite systems such as GPS are widely used in various civilian and military applications. This makes global navigation satellite systems a regular target for attack by adversaries or other illicit actors hoping to disrupt economic, military, or other activities. One mode of attack is to "spoof" GNSS satellite signals, such as by transmitting fake GNSS signals with incorrect position or time information, in order to disrupt a receiver's ability to determine its position accurately.

GNSS signals are typically very weak at ground-level, often around −125 dBm down to −150 dBm or even lower. This makes it particularly easy for attackers or other illicit actors to broadcast spoofed GNSS signals at higher signal strengths over large areas that drown out genuine GNSS signals at receivers. Existing anti-spoofing systems often rely on a comparison of a received signal strength of a GNSS signal with an expected signal strength. If the received signal strength is significantly stronger than expected for a GNSS signal, the received signal is unlikely to be a genuine GNSS signal. However, in a targeted attack or when a genuine GNSS signal is particularly weak, it may not be necessary for a spoofed GNSS signal to be significantly stronger than expected to be effective.

SUMMARY

This disclosure provides autonomous vehicles supporting global navigation satellite system (GNSS) anti-spoofing.

In a first embodiment, a system includes a vehicle and a vehicle control system configured to autonomously control one or more operations of the vehicle. The system also includes a navigation receiver configured to identify a location of the vehicle and to provide the identified location to the vehicle control system. To identify the location of the vehicle, the navigation receiver is configured to identify whether navigation signals received by the navigation receiver are spoofed based on angles of arrival for the navigation signals and to suppress any of the navigation signals determined to be spoofed.

In a second embodiment, an apparatus includes a navigation receiver configured to identify a location of a vehicle and to output the identified location. The navigation receiver includes at least one processor configured to identify whether navigation signals received by the navigation receiver are spoofed based on angles of arrival for the navigation signals and to suppress any of the navigation signals determined to be spoofed.

In a third embodiment, a method includes identifying a location of a vehicle using a navigation receiver and providing the identified location to a vehicle control system of the vehicle. The method also includes autonomously controlling one or more operations of the vehicle using the vehicle control system. Identifying the location of the vehicle includes identifying whether navigation signals received by the navigation receiver are spoofed based on angles of arrival for the navigation signals and suppressing any of the navigation signals determined to be spoofed.

In some embodiments, the identified location of the vehicle may be used to verify whether the vehicle is following a desired route and/or to calculate a route to a desired destination.

In some embodiments, any of the navigation signals determined to be spoofed may be suppressed in order to prevent an illicit actor from misdirecting the vehicle to an undesired location and/or from causing the vehicle to make course corrections based on an incorrect current location of the vehicle.

In some embodiments, the one or more operations of the vehicle may include turning the vehicle, accelerating, and decelerating.

In some embodiments, the navigation receiver may include at least one first processor configured to identify whether the navigation signals are spoofed and to control suppression of any of the navigation signals determined to be spoofed, and the vehicle control system may include at least one second processor configured to autonomously control the one or more operations of the vehicle.

In some embodiments, the vehicle control system may be configured to autonomously control at least one of the one or more operations of the vehicle based on the identified location of the vehicle.

In some embodiments, the navigation receiver is configured to identify the location of the vehicle using any of the navigation signals determined not to be spoofed.

In some embodiments, the navigation receiver includes a global navigation satellite system (GNSS) receiver.

Other technical features may be readily apparent to one skilled in the art from the following figures, descriptions, and claims.

BRIEF DESCRIPTION OF THE DRAWINGS

For a more complete understanding of this disclosure, reference is made to the following description, taken in conjunction with the accompanying drawings, in which.

DETAILED DESCRIPTION

FIGS. 1 through 8, described below, and the various embodiments used to describe the principles of the present invention in this patent document are by way of illustration only and should not be construed in any way to limit the scope of the invention. Those skilled in the art will understand that the principles of the present invention may be implemented in any type of suitably arranged device or system.

As noted above, global navigation satellite system (GNSS) signals are generally weak and are often subject to spoofing attempts by adversaries or other illicit actors hoping to disrupt economic, military, or other activities. One type of spoofing attempt involves transmitting fake GNSS satellite signals with incorrect position or time information in order to disrupt a GNSS receiver's ability to determine its position accurately. Approaches that rely on comparing a received signal strength of a GNSS signal with an expected signal strength can suffer from various shortcomings and are not always effective.

This disclosure provides various anti-spoofing techniques for GNSS receivers. As described in more detail below, a receiver includes a multi-element antenna and a signal processor. The antenna includes multiple antenna elements that can receive GNSS signals (real and spoofed), and the signal processor can perform signal processing techniques to identify an angle of arrival for each GNSS signal. The angles of arrival for the GNSS signals can be used to identify GNSS signals that are legitimate and any GNSS signals that may be spoofed. The signal processor processes the legitimate GNSS signals or causes the legitimate GNSS signals to be output to another component for processing, and any spoofed GNSS signals can be suppressed. In this way, these techniques help to reduce the ability of adversaries or other illicit actors to disrupt the use of a GNSS by spoofing GNSS signals.

Figure 1:
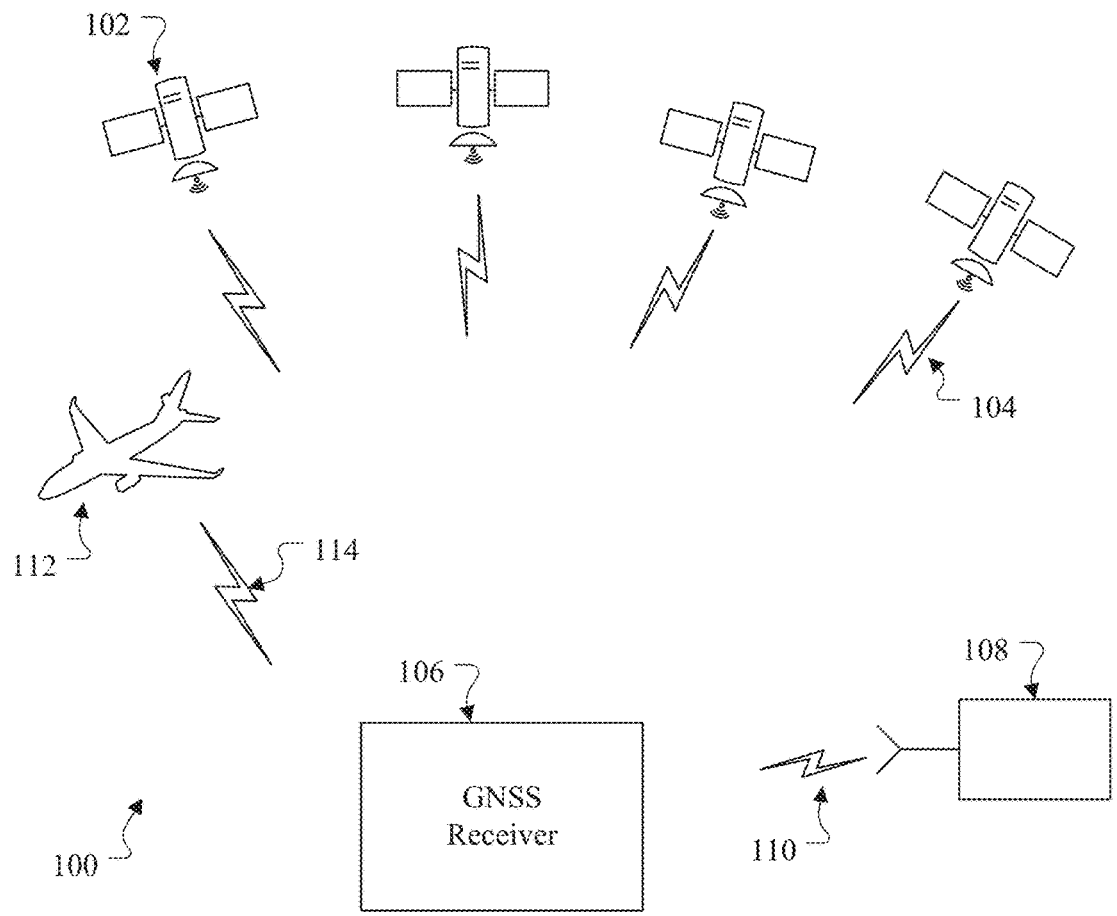
FIG. 1 illustrates an example global navigation satellite system (GNSS) according to this disclosure.

FIG. 1 illustrates an example global navigation satellite system (GNSS) 100 according to this disclosure. As shown in FIG. 1, the GNSS 100 includes multiple satellites 102, where the satellites 102 transmit wireless position signals 104. The satellites 102 here support any suitable satellite navigation system, such as the Global Positioning System (GPS), Global Navigation Satellite System (GLONASS), Galileo system, BeiDou system, or other global/regional system for navigation that uses a constellation of satellites (now known or later developed/deployed). Each satellite 102 includes any suitable structure configured to transmit position signals 104 from orbit.

The position signals 104 contain any suitable content. In some embodiments, for example, the position signals 104 transmitted by each satellite 102 includes the current position of that satellite 102 and the current time held by an atomic clock on-board that satellite 102. As a particular example, the position signals 104 transmitted by each satellite 102 may include the current time of that satellite's atomic clock, ephemerides, and an almanac. Ephemerides very accurately describe the current positions of the satellites 102, but ephemerides are valid for shorter periods of time (such as four hours). The almanac coarsely describes the positions of the satellites 102 and therefore contains less-accurate orbital information than the ephemerides, but the almanac is valid for longer periods of time (such as up to 90 days). The almanac is often used to initially identify the approximate positions of the satellites 102, and the ephemerides are then used after that. Of course, any other or additional information may be included in the position signals 104.

As shown in this example, a receiver 106 receives the position signals 104 from the satellites 102 and uses the position signals 104 to identify its geo-spatial location. This may occur in any suitable manner, including those techniques now known or later developed. The receiver 106 may be used in any number of devices or systems that may operate based on or using the geo-spatial location of the receiver 106. For example, the receiver 106 may be used in civilian or military land vehicles (such as cars, trucks, and semi-trucks), autonomous vehicles (such as autonomous passenger vehicles, autonomous shuttles or buses, or other autonomous vehicles), handheld devices, civilian or military ships or other vessels, or civilian or military drones, aircraft, rockets, missiles, or other flight vehicles.

As shown in FIG. 1, the receipt and use of the position signals 104 by the receiver 106 can be affected by one or more adversaries or other illicit actors. For example, one or more spoofing transmitters 108 on the ground may be used to generate and transmit spoofed position signals 110, and/or one or more spoofing transmitters 112 in the air may be used to generate and transmit spoofed position signals 114. The spoofed position signals 110, 114 may contain at least one type of inaccurate data, such as incorrect time information or incorrect position information (like incorrect ephemerides or an incorrect almanac). The spoofed position signals 110, 114 may be broadcast over a large area or targeted to a well-defined area or even to a specific device or system. Without anti-spoofing capabilities, the spoofed position signals 110, 114 interfere with proper operation of the receiver 106 and may interfere with or prevent the receiver 106 from accurately identifying its position.

This disclosure recognizes that while one or more spoofed position signals 110, 114 may be received by the receiver 106, it is highly unlikely that multiple spoofed position signals 110, 114 are received at the same angles (directions) normally associated with the satellites 102. For example, a single spoofing transmitter 108 on the ground or a single spoofing transmitter 112 in the air might be used to transmit multiple spoofed position signals 110, 114 that are allegedly from different satellites 102. However, all of those spoofed position signals 110, 114 would have the same general angle of arrival at the receiver 106.

As described in more detail below, the receiver 106 includes an antenna formed using multiple antenna elements, which can receive GNSS signals (such as legitimate position signals 104 and any spoofed position signals 110, 114). The receiver 106 performs signal processing using the signals received by the antenna to identify the angles of arrival for the GNSS signals, such as by using phase differences between the GNSS signals received by the different antenna elements. The receiver 106 uses the identified angles of arrival for the GNSS signals to determine whether it appears spoofing is being attempted. For example, the receiver 106 may determine if multiple GNSS signals are received along substantially the same angle of arrival (such as within about 5° to about 10° of one another), which may indicate that a spoofer is transmitting multiple GNSS signals from the same location. As another example, the receiver 106 may determine if GNSS signals are received along one or more expected angles of arrival, such as where each expected angle of arrival is associated with an expected position of one of the satellites 102. If any spoofed position signals 104 are detected, the receiver 106 can discard, block, or otherwise suppress the spoofed position signals 104 and use only legitimate position signals 104.

Note that it is also possible for the receiver 106 to incorporate one or more additional analyses when determining whether one or more GNSS signals are legitimate. For example, as noted above, GNSS signals are typically very weak at ground-level, often around −125 dBm down to −150 dBm or even lower. Thus, the receiver 106 may measure the received signal strength of each GNSS signal and compare the received signal strength to a threshold, such as −120 dBm or lower, to determine whether the GNSS signal may represent a legitimate signal.

The receiver 106 can use any GNSS signal that is determined to be legitimate in order to identify a position of the receiver 106, meaning any GNSS signal that is determined not to be spoofed. For example, the receiver 106 can block any GNSS signal that is determined to be a spoofed signal, such as by applying amplitude and phase weightings to different channels (different antenna elements) and combining the resulting signals to optimize the reception of legitimate signals and to suppress potential or actual spoofed signals. In some embodiments, the receiver 106 can use the optimized legitimate signals to calculate a position of the receiver 106. In other embodiments, the receiver 106 can multiplex the optimized legitimate signals (those GNSS signals determined not to be spoofed) and re-transmit the multiplexed signals on the same carrier frequency or frequencies as the GNSS signals received by the antenna. This may allow, for example, another component of the receiver 106 (such as a standard GNSS receiver) to receive the optimized legitimate signals only and to determine a position of the receiver 106 based on those signals.

By incorporating the consideration of angle of arrival into GNSS anti-spoofing operations, the receiver 106 can more effectively combat GNSS spoofing. For example, the receiver 106 can more easily detect if and when one or more spoofing transmitters (either on the ground or in the air) are transmitting or broadcasting a larger number of GNSS signals. The receiver 106 can also more easily detect if and when one or more spoofing transmitters (either on the ground or in the air) are transmitting or broadcasting GNSS signals from unexpected directions. Of course, the receiver 106 can use the GNSS signals' angles of arrival in any other or additional manner to detect actual or possible spoofing of the GNSS signals.

Although FIG. 1 illustrates one example of a GNSS 100, various changes may be made to FIG. 1. For example, any number of receivers 106 may be used with a GNSS 100. Also, the GNSS 100 may include any suitable number of satellites 102 in any suitable configuration, and the satellites 102 that are visible to any given receiver 106 at any specific time can vary. In addition, depending on the circumstances, there may be any number of spoofing transmitters on the ground or in the air for a given environment.

Figure 2:
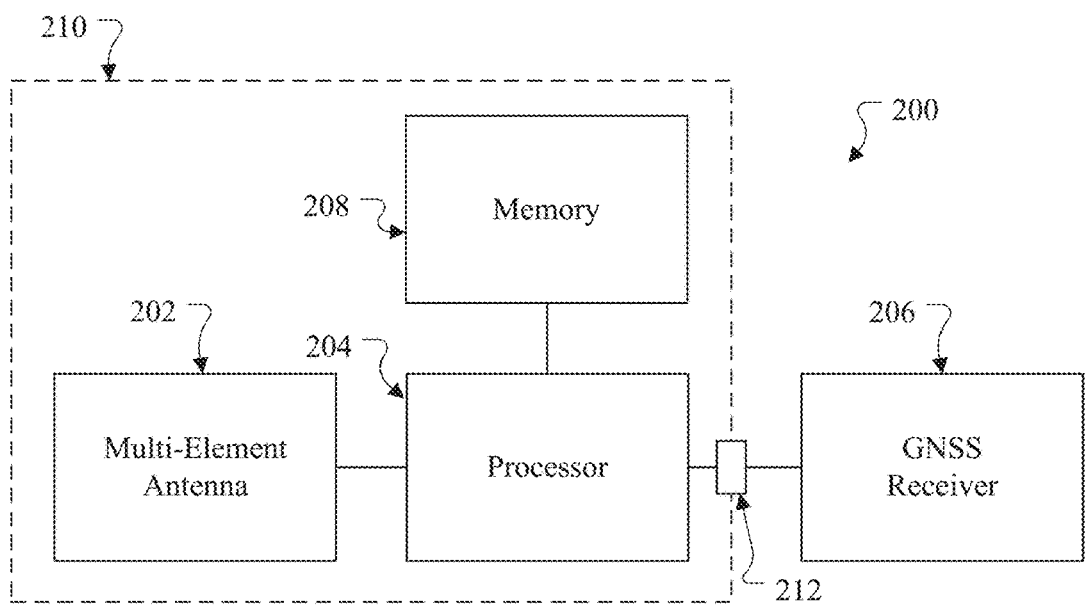
FIG. 2 illustrates an example device supporting GNSS anti-spoofing according to this disclosure.

FIG. 2 illustrates an example device 200 supporting GNSS anti-spoofing according to this disclosure. The device 200 shown in FIG. 2 may, for example, represent one possible implementation of part or all of the receiver 106 in the GNSS 100 of FIG. 1. However, the device 200 may be used in any other suitable system.

As shown in FIG. 2, the device 200 generally includes a multi-element antenna 202 and a processor 204. The device 200 may also include a GNSS receiver 206 and a memory 208. The multi-element antenna 202 represents an antenna that includes multiple antenna elements, which can be arranged in various ways. For example, the multi-element antenna 202 may represent an antenna having two antenna elements that are spaced apart by a known distance. As another example, the multi-element antenna 202 may represent an antenna having four antenna elements, such as a first two-element antenna and a second two-element antenna arranged orthogonally, with known distances separating the various antenna elements. The multi-element antenna 202 includes any suitable structure containing multiple antenna elements configured to receive wireless signals. Note that a multi-element antenna 202 can include a single antenna having multiple antenna elements, separate antennas each having one or more antenna elements, or any suitable combination thereof.

The multi-element antenna 202 is in electrical communication with the processor 204, which processes the received signals. In some embodiments, various components may be positioned between the multi-element antenna 202 and the processor 204 to pre-process the received signals. These components may include one or more filters (such as low-pass, band-pass, high-pass, or surface acoustic wave or "SAW" filters) and one or more amplifiers (such as low-noise amplifiers or "LNAs"), which can be used to clean and amplify GNSS signals before they are received by the processor 204. In other embodiments, the processor 204 itself may include any necessary or desired filtering, amplification, or other pre-processing functionality.

GNSS signals are received by the multi-element antenna 202 and transmitted to the processor 204. As described in more detail below, the processor 204 analyzes the GNSS signals to determine whether any of the GNSS signals received via the multi-element antenna 202 are spoofed GNSS signals (such as from one or more spoofing transmitters 108, 112 on the ground or in the air). The processor 204 may also discard, block, or otherwise counteract any spoofed GNSS signals. In some embodiments, once the spoofed GNSS signals have been discarded, blocked, or otherwise removed, the processor 204 may transmit only genuine GNSS signals to the GNSS receiver 206 for use in calculating a position. In other embodiments, the processor 204 itself may use the genuine GNSS signals to calculate a position.

The processor 204 includes any suitable processing device or devices configured to analyze at least GNSS signals to identify and suppress spoofed GNSS signals. For example, the processor 204 may include one or more microprocessors, microcontrollers, digital signal processors (DSPs), field programmable gate arrays (FPGAs), application specific integrated circuits (ASICs), or discrete circuits. In some embodiments, the processor 204 is used exclusively to identify and suppress spoofed GNSS signals. In other embodiments, the processor 204 can be used to perform other functions associated with the device 200 or with a larger device or system in which the device 200 is used.

The GNSS receiver 206 may be used to process received GNSS signals and identify a location of the device 200. For example, the GNSS receiver 206 may use the position and timing information contained in legitimate position signals 104 to identify a geo-spatial location of the device 200. The GNSS receiver 206 includes any suitable structure configured to process GNSS signals, such as a GPS, GLONASS, Galileo, or BeiDou receiver. As noted above, the GNSS receiver 206 is optional in the device 200 since the functionality of the GNSS receiver 206 may be incorporated into or performed by the processor 204.

The memory 208 is coupled to the processor 204 and can be used to store and facilitate retrieval of instructions and data used, generated, or collected by the processor 204. For example, the memory 208 may be used to store ephemerides and an almanac received by the device 200 from one or more GNSS satellites 102. The memory 208 represents any suitable volatile or non-volatile storage and retrieval device or devices, such as random access memory, read only memory, Flash memory, optical disc, or hard drive. Note, however, that the memory 208 may be incorporated into the processor 204 so that a separate memory is not required in the device 200.

In some embodiments, the multi-element antenna 202 and the processor 204 (and optionally the memory 208) can be used as a drop-in replacement for a conventional antenna connected to a GNSS receiver 206. For example, in particular embodiments, the multi-element antenna 202 and the processor 204 (and optionally the memory 208) may form a replacement antenna unit 210. The replacement antenna unit 210 may include one or more standard antenna attachments or other electrical connectors 212 in order to connect to a separate GNSS receiver 206, such as when the one or more electrical connectors 212 can be coupled to an antenna connection of the GNSS receiver 206. The output of the replacement antenna unit 210 is essentially the same as the output of a conventional antenna, namely multiplexed GNSS signals transmitted on the same frequencies as the original GNSS signals. However, the replacement antenna unit 210 operates to reduce or prevent spoofed GNSS signals from being output. In this way, existing GNSS receivers 206 can be upgraded with anti-spoofing capabilities by simply replacing the existing antenna with the replacement antenna unit 210 (without replacing the entire GNSS receiver system), saving time and resources.

In other embodiments, the processor 204 may be configured to carry out the normal functions of the GNSS receiver 206, such as by calculating the position of the device 200 based on the legitimate GNSS signals while suppressing any spoofed GNSS signals. In that case, a separate GNSS receiver 206 is not required in order to determine a position. In these embodiments, the processor 204 may instead output the determined position, such as via a display device to a user or via a different connection to a separate navigation system or other system, or use the determined position in some other manner.

Although FIG. 2 illustrates one example of a device 200 supporting GNSS anti-spoofing, various changes may be made to FIG. 2. For example, the device 200 may include any suitable number of each component in any suitable arrangement. Also, the architecture of the device 200 has been simplified here for ease of illustration and explanation. A device 200 supporting GNSS anti-spoofing functionality may include any number of other components that support any desired functionality in the device 200. In addition, various components shown in FIG. 2 may be combined, further subdivided, or omitted and additional components may be added according to particular needs. As a particular example, the operations performed by the processor 204 do not necessarily need to be carried out by a single device. Some tasks may be off-loaded to one or more other processors (such as one or more microprocessors, microcontrollers, DSPs, ASICs, FPGAs, or built-in GNSS receivers), which can also be part of the replacement antenna unit 210 where appropriate.

Figure 3:
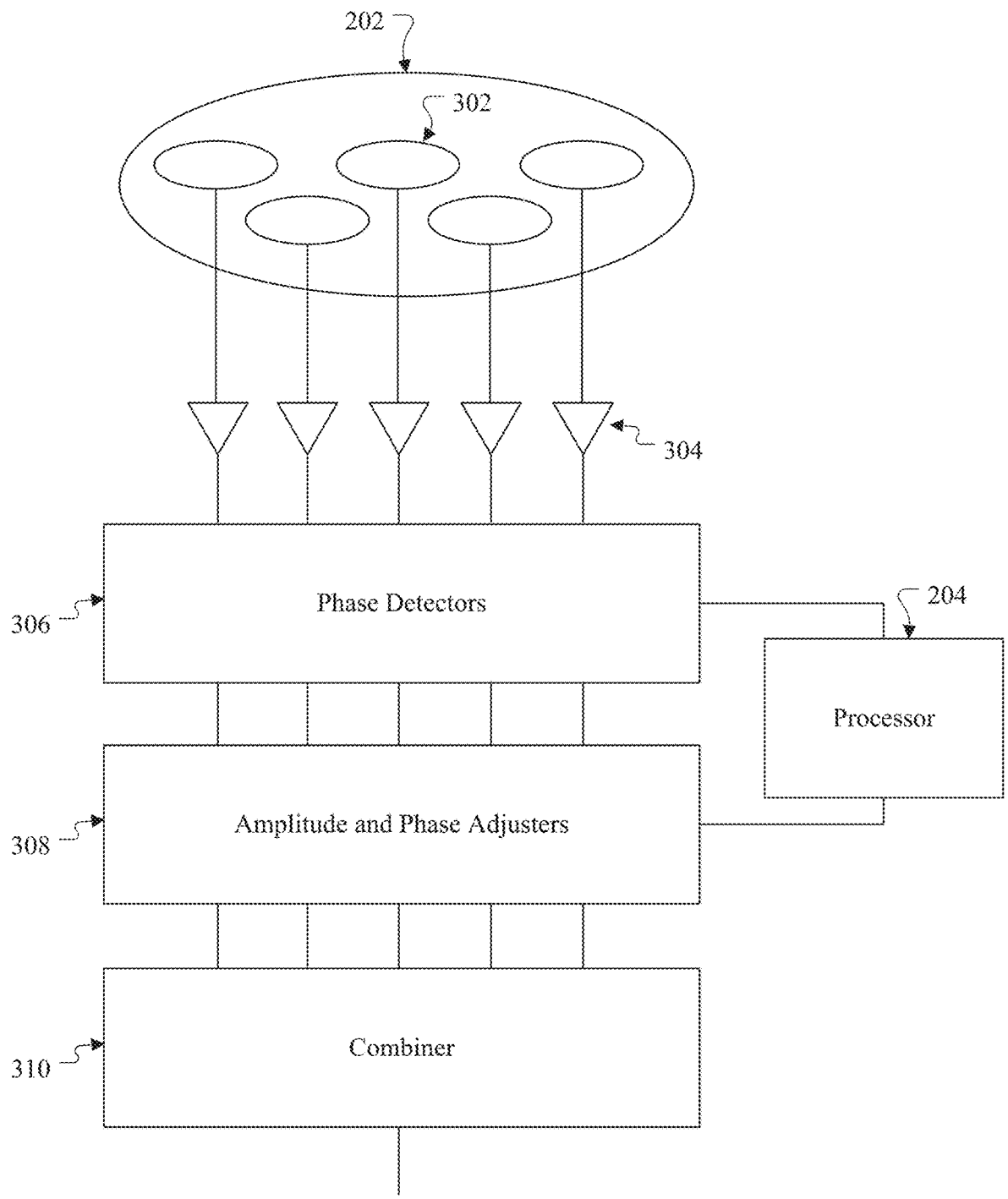
FIG. 3 illustrates example signal processing in a device supporting GNSS anti-spoofing according to this disclosure.

FIG. 3 illustrates example signal processing in a device supporting GNSS anti-spoofing according to this disclosure. The signal processing shown in FIG. 3 may, for example, be performed in the device 200 of FIG. 2 operating in the GNSS 100 of FIG. 1. However, the signal processing shown in FIG. 3 may be performed by any other suitable device operating in any other suitable system.

As shown in FIG. 3, the multi-element antenna 202 includes multiple antenna elements 302. Each antenna element 302 represents a separate structure configured to receive at least one wireless signal and to output at least one electrical signal corresponding to the wireless signal. The antenna elements 302 therefore form a spatial array of N elements, where N is an integer greater than or equal to two. The antenna elements 302 can be arranged in various patterns, such as in a one-dimensional, two-dimensional, or three-dimensional arrangement. In this example, there are five antenna elements 302, although this is merely for illustration.

The antenna elements 302 are respectively coupled to different channel receivers 304. Each channel receiver 304 operates to recover a GNSS signal from the electrical signal output by one of the antenna elements 302. Each channel receiver 304 can also filter, decode, digitize, or otherwise pre-process the GNSS signal to generate a recovered GNSS signal. The channel receivers 304 output the recovered GNSS signal for further processing. Each channel receiver 304 includes any suitable structure configured to receive and process electrical signals from an antenna element 302.

In this example, the recovered GNSS signals are provided to a set of phase detectors 306. The phase detectors 306 operate to identify the phases of any GNSS signals received by the antenna elements 302 and output as recovered GNSS signals by the channel receivers 304. Each phase detector 306 includes any suitable structure configured to measure a phase of a signal. The identified phases are provided to the processor 204, which can use the phases to identify an angle of arrival for each of the recovered GNSS signals. In some embodiments, for example, the angle of arrival of each GNSS signal is calculated by measuring a time difference of arrival (TDOA) for that GNSS signal. The time difference of arrival can be determined by identifying the difference in received phase for that GNSS signal at each element 302 in the multi-element antenna 202.

Consider a simple example based on a two-element antenna 202 in which each antenna element 302 is located at a fixed position along a line joining the two elements 302. The distance between the two antenna elements 302 is known. When the angle of arrival of a signal is perpendicular to the line joining the two antenna elements 302, the signal is picked up by both antenna elements 302 simultaneously, meaning there is a phase difference of zero between the signal as received at the two antenna elements 302. If a signal is incident upon the antenna elements 302 at an angle that is parallel to the line joining the two antenna elements 302, the signal as received at the two antenna elements 302 will have a phase difference based on the known distance between the antenna elements 302. For instance, if the distance between the two antenna elements 302 is half a wavelength of the GNSS signal, the phase difference will be $\pi$. In general, as the angle of arrival varies, the phase difference between a GNSS signal as received by multiple antenna elements 302 will change accordingly and can be used to provide an indication of the angle of arrival of the GNSS signal.

By increasing the number of antenna elements 302 in the multi-element antenna 202, more detail can be provided regarding the angle of arrival. For example, using a four-element antenna 202 (such as an antenna 202 having two orthogonally-positioned two-element antennas), the elevation of a received signal as well as the azimuth of the received signal can be calculated. As a particular example, by employing a square lattice of four antenna elements 302 with known distances between the four antenna elements 302, the received phase will be the same at all four antenna elements 302 if the direction of arrival is from zenith (perpendicular to the plane of the antenna 202). If the elevation declines towards the plane of the antenna 202 (at the same azimuth previously described), the phase difference between one pair of antenna elements 302 will be zero for all elevations, but the phase difference between the orthogonal pairs of antenna elements 302 will increase from zero to $\pi$ as a function of the cosine of the elevation.

Note that these are examples only and are merely meant to illustrate different ways in which multiple GNSS signals received by the antenna elements 302 of a multi-element antenna 202 may be used to identify angles of arrival for the GNSS signals. Of course, any other suitable techniques may be used to identify the angle of arrival for each GNSS signal received by the antenna elements 302 of the multi-element antenna 202.

The processor 204 uses the angles of arrival for the GNSS signals to identify any GNSS signals that might be spoofed. For example, genuine GNSS signals are received from satellites 102 that typically orbit the Earth in a medium-Earth orbit. As a particular example, GPS currently uses thirty-one satellites 102 orbiting the Earth at an altitude of approximately 20,200 kilometers. At this altitude, each satellite 102 makes two complete orbits each sidereal day. Also, since at least four satellites 102 need to be visible (have an unbroken line of sight) for a position to be calculated, the orbits of the satellites 102 are appropriately spread to provide coverage at all locations on the surface of the Earth. Thus, one property of genuine GNSS signals is that they typically come from disparate directions in the field-of-view of the antenna 202 (meaning the area of the sky that is visible from the antenna's position). In contrast, an adversary or other illicit actor attempting to spoof a GNSS signal is likely to transmit multiple spoofed GNSS signals from a single location or from a limited number of locations.

This disclosure recognizes that, by comparing the angles of arrival of the received GNSS signals, it can be reliably determined that two or more GNSS signals are spoofed if they are received from substantially the same direction, meaning the angles of arrival of the signals are substantially the same. Here, "substantially the same" may mean a difference in angle of arrival of less than about 5° to about 10° (possibly in both azimuth and elevation). Note, however, that other values may be used. The precise angle can be chosen to give a proper balance between maximizing the detection of spoofed GNSS signals and minimizing the false positive rate that may be caused by a temporary coincidence of angles of arrival of genuine GNSS signals as satellite positions change.

In addition to determining if multiple angles of arrival are substantially the same, the processor 204 may compare each angle of arrival of the received GNSS signals with an expected position of a satellite 102 within the antenna's field-of-view from which a GNSS signal is expected to be received. For example, in some cases, an adversary or other illicit actor may be more likely to transmit a spoofed GNSS signal from a ground-based antenna. As a result, GNSS signals received from a higher elevation, such as close to the zenith, are less likely to be spoofed, while GNSS signals received from close to the horizon are more likely to be spoofed. In other cases, such as when an adversary has air superiority, it may be more likely that spoofed GNSS signals will be transmitted from an aircraft and therefore have a higher elevation. Thus, the processor 204 may allow the receiver 106 to selectively consider elevation as part of the analysis of the angles of arrival. Of course, it is possible for a genuine GNSS signal to be observed at any position in an antenna's field-of-view, so it may not be desirable or feasible to use an elevation-based determination on its own to identify spoofed GNSS signals. However, when used in conjunction with a comparison of the angles of arrival of two or more received GNSS signals, this can be used to further improve the detection of spoofed signals.

Alternatively or in addition to considering the elevation of received GNSS signals, the angles of arrival of the received GNSS signals may be compared to an almanac (such as the GPS almanac), which coarsely describes the positions of all satellites 102, or to previously-received ephemerides, which very accurately describe the current positions of the satellites 102. In some embodiments, the almanac may be calculated and loaded off-line into the memory 208, such as separate from the received GNSS signals, since the orbits of the satellites 102 are well-known and cannot easily be changed. In other embodiments, the almanac or the ephemerides can be obtained from the received GNSS signals and stored in the memory 208. However obtained, if a determined angle of arrival of a GNSS signal does not correspond to an expected position of a GNSS satellite 102 as defined by the almanac or ephemerides, it is likely that the signal is spoofed. Similarly, if the ephemeris of a given satellite 102 changes abruptly or does not change significantly over time, this can also be an indication that a signal is spoofed. The processor 204 may therefore include a GNSS receiver or other suitable circuitry or programming in order to acquire the GNSS almanac or ephemerides.

By using information associated with the expected positions of the GNSS satellites 102 in conjunction with the comparison of the angles of arrival of two or more incoming GNSS signals, this provides increased confidence or verification of genuine GNSS signals. Also, the use of the expected positions of the GNSS satellites 102 (whether based on elevation, an almanac, ephemerides, or other data) helps to speed up the anti-spoofing detection process since the device 200 may only search for GNSS signals that originate from satellites 102 expected to be visible (above the horizon). In this way, no time or resources may be wasted attempting to lock onto genuine GNSS signals that are not capable of being received, and no time or resources may be spent attempting to verify received GNSS signals that appear to be from satellites 102 that should not be visible.

As noted above, in addition to identifying and using the angles of arrival, the processor 204 may use additional information in attempting to identify spoofed GNSS signals. For example, the signal strength of a received GNSS signal can be compared with an expected signal strength (such as a threshold of −120 dBm or lower). If a received GNSS signal has a received signal strength that exceeds this threshold, the GNSS signal can be identified as being a spoofed signal.

In the example shown in FIG. 3, the processor 204 uses the identification of genuine and spoofed GNSS signals to control amplitude and phase adjusters 308. The amplitude and phase adjusters 308 are configured to weight the GNSS signals from the different channels (the different channel receivers 304) differently. For example, the amplitude and phase adjusters 308 can weight genuine GNSS signals more and discard, block, or otherwise suppress spoofed GNSS signals by weighting the GNSS signals less. The amplitude and phase adjusters 308 can also adjust the phases of the same GNSS signal received by different antenna elements 302 so that the phases of that GNSS signal are aligned in each channel. Each of the amplitude and phase adjusters 308 includes any suitable structure for adjusting the amplitude and phase of a signal, such as a weighting network.

The resulting signals from the amplitude and phase adjusters 308 are provided to a combiner 310, which combines the signals. For example, the combiner 310 may multiplex the genuine GNSS signals onto the same carrier frequency or frequencies on which the original GNSS signals were received. Ideally, the output of the combiner 310 is an antenna pattern that optimizes the reception of legitimate GNSS signals and suppresses potential or actual spoofed GNSS signals. The combiner 310 includes any suitable structure for combining signals, such as a multiplexer. The final signal output from the combiner 310 can be provided to any suitable destination, such as the GNSS receiver 206 or the processor 204 for use in identifying a location.

Although FIG. 3 illustrates one example of the signal processing in a device supporting GNSS anti-spoofing, various changes may be made to FIG. 3. For example, various components shown in FIG. 3 may be combined, further subdivided, or omitted and additional components may be added according to particular needs. As a particular example, the various components 304-310 shown in FIG. 3 may be incorporated into the processor 204. Also, if the processor 204 is analyzing the legitimate GNSS signals to identify a position, there may be little or no need to multiplex or otherwise combine the weighted/adjusted GNSS signals (since the processor 204 may simply process the weighted/adjusted GNSS signals). In addition, the operations performed by the processor 204 do not necessarily need to be carried out by a single device, and some tasks may be off-loaded to one or more other processors.

Figure 4:
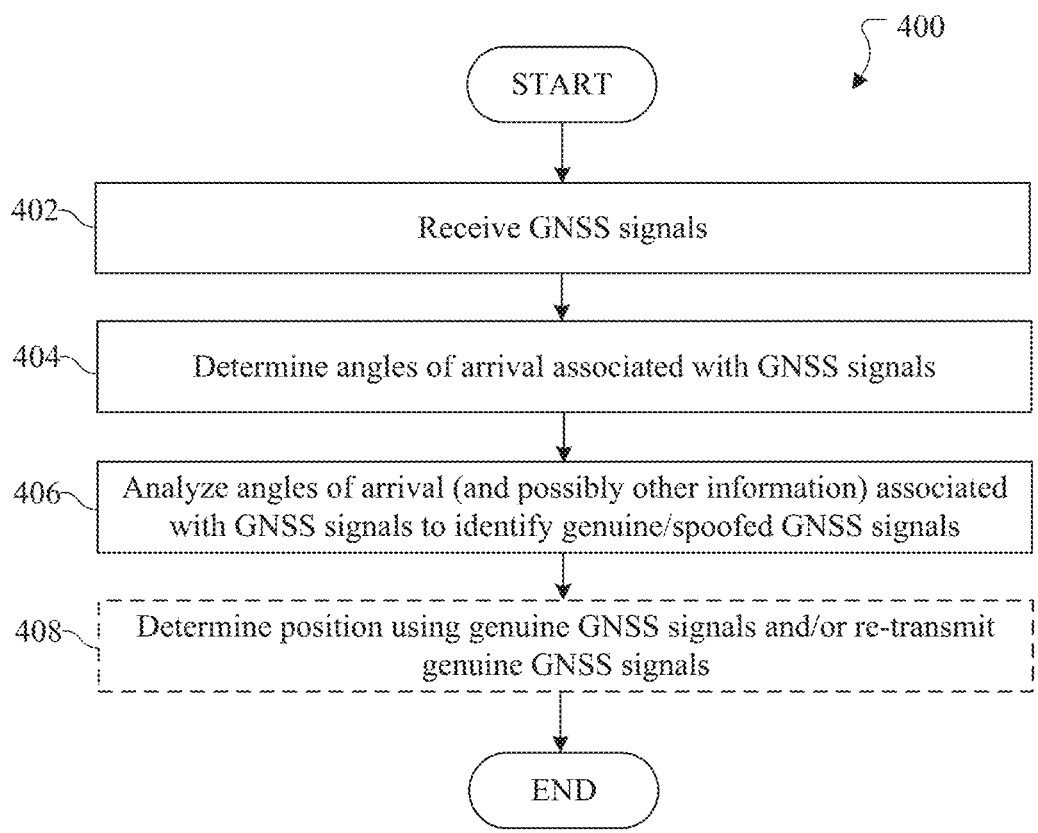
FIG. 4 illustrates an example method for GNSS anti-spoofing according to this disclosure.

FIG. 4 illustrates an example method 400 for GNSS anti-spoofing according to this disclosure. For ease of explanation, the method 400 of FIG. 4 is described as involving the use of the device 200 of FIG. 2 in the GNSS 100 of FIG. 1. However, the method 400 may involve the use of any other suitable device operating in any other suitable system.

As shown in FIG. 4, multiple GNSS signals are received at step 402. This may include, for example, multiple position signals 104 being received from multiple satellites 102 using the antenna elements 302 of the multi-element antenna 202. This may also include one or more spoofed position signals 110, 114 possibly being received from one or more spoofers using the antenna elements 302 of the antenna 202. This may further include the device 200 performing any desired pre-processing operations, such as filtering and amplifying the received GNSS signals using the channel receivers 304.

Angles of arrival for the received GNSS signals are determined at step 404. This may include, for example, the phase detectors 306 measuring the phases of the GNSS signals received by each of the antenna elements 302. This may also include the processor 204 analyzing the measured phases to identify the time difference of arrival of each GNSS signal at the different antenna elements 302 of the multi-element antenna 202. The time difference of arrival can be identified by measuring the difference in received phase for each GNSS signal at each element 302 in the multi-element antenna 202, and the time differences of arrival are used to identify the angles of arrival. As noted above, the determination of the angles of arrival can vary based on the number and arrangement of the antenna elements 302 in the antenna 202. Also as noted above, this process can be shortened by attempting to lock onto and process only those GNSS signals transmitted by satellites 102 that should be visible to the antenna 202. This can be based on ephemerides or an almanac previously downloaded or otherwise obtained by the device 200.

The angles of arrival are analyzed to determine which of the received GNSS signals is legitimate and which of the received GNSS signals (if any) is spoofed at step 406. This may include, for example, the processor 204 determining if multiple received GNSS signals have substantially the same angle of arrival or if any received GNSS signal does not match or substantially match an expected angle of arrival. Other analyses may also be performed, such as by comparing the received signal strength of each GNSS signal to a threshold value and identifying any GNSS signal having an excessive signal strength as being spoofed.

The identification of the legitimate and spoofed GNSS signals may be used in any suitable manner. For example, a location of the device can be determined or any genuine GNSS signals can be re-transmitted for use in determining the location of the device at step 408. In some embodiments, this may include the processor 204 using the legitimate GNSS signals to identify the position of the device 200. In other embodiments, this may include the amplitude and phase adjusters 308 adjusting the legitimate GNSS signals and the combiner 310 combining the legitimate GNSS signals for output to a GNSS receiver 206 or other destination. The legitimate GNSS signals may be weighted more heavily and aligned in phase using the amplitude and phase adjusters 308. Any spoofed GNSS signals may simply be discarded or blocked, such as by appropriate weighting of the amplitude and phase adjusters 308. In particular implementations, any spoofed GNSS signals may be discarded or blocked using one or more null steering techniques, such as those described in Monzingo et al., "Introduction to Adaptive Arrays" (John Wiley 1980), which is hereby incorporated by reference. This may be sufficient in a scenario where a sufficient number of genuine GNSS signals (such as four GNSS signals) can still be properly received and used to calculate a position. In this manner, the processor 204 may re-transmit genuine GNSS signals to a separate GNSS receiver 206 as described above, or the processor 204 itself may be configured to calculate a position from the genuine GNSS signals.

Although FIG. 4 illustrates one example of a method 400 for GNSS anti-spoofing, various changes may be made to FIG. 4. For example, while shown as a series of steps, various steps in FIG. 4 may overlap, occur in parallel, or occur any number of times.

Figure 5:
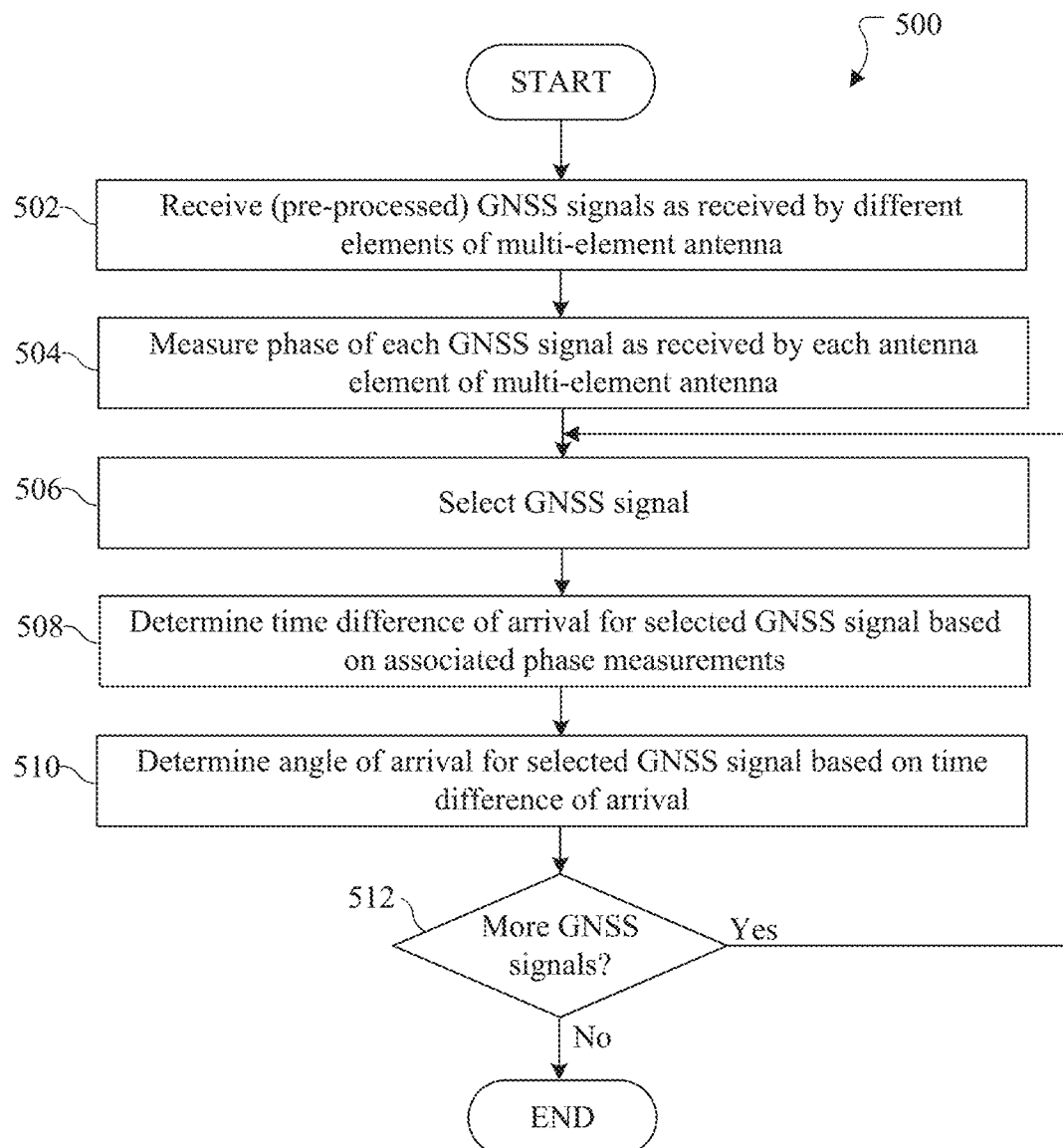
FIG. 5 illustrates an example method for processing signals to support GNSS anti-spoofing according to this disclosure.

FIG. 5 illustrates an example method 500 for processing signals to support GNSS anti-spoofing according to this disclosure. More specifically, the method 500 shown in FIG. 5 may be performed during step 404 in the method 400 of FIG. 4 to identify the angles of arrival for GNSS signals. For ease of explanation, the method 500 of FIG. 5 is described as involving the use of the device 200 of FIG. 2 in the GNSS 100 of FIG. 1. However, the method 500 may involve the use of any other suitable device operating in any other suitable system.

As shown in FIG. 5, multiple (possibly pre-processed) GNSS signals are received at step 502. This may include, for example, the channel receivers 304 processing electrical signals from the antenna elements 302 of the multi-element antenna 202 and performing any pre-processing operations (such as filtering and amplification). A phase of each GNSS signal as received at each element of the multi-element antenna is measured at step 504. This may include, for example, the phase detectors 306 measuring the phases of each of the GNSS signals as received by each of the antenna elements 302 and processed by the associated channel receiver 304.

A GNSS signal is selected at step 506. This may include, for example, the processor 204 selecting one of the GNSS signals that was received by any of the antenna elements 302 of the multi-element antenna 202. As noted above, the processor 204 may optionally exclude any GNSS signals that should not be processed, such as any GNSS signals that allege to be transmitted from satellites 102 that should not be visible to the receiver 106 (which may be based on an almanac, ephemerides, or other information stored in the memory 208 of the device 200).

A time difference of arrival for the selected GNSS signal is determined at step 508. This may include, for example, the processor 204 determining the time difference of arrival based on the difference in the measured phases for the selected GNSS signal as received by the different antenna elements 302. An angle of arrival for the selected GNSS signal is determined at step 510. This may include, for example, the processor 204 determining the angle of arrival for the selected GNSS signal based on the calculated time difference of arrival and the known geometry or positions of the antenna elements 302.

A determination is made whether any additional GNSS signals remain to be processed at step 512. If so, the process returns to step 506 to select another GNSS signal, which again may include excluding any GNSS signals that allege to be transmitted from satellites 102 that should not be visible to the receiver 106. Otherwise, the method 500 ends.

Although FIG. 5 illustrates one example of a method 500 for processing signals to support GNSS anti-spoofing, various changes may be made to FIG. 5. For example, while shown as a series of steps, various steps in FIG. 5 may overlap, occur in parallel, or occur any number of times. As a particular example, some or all of the received GNSS signals may be processed in parallel to identify the angles of arrival for those GNSS signals.

Figure 6:
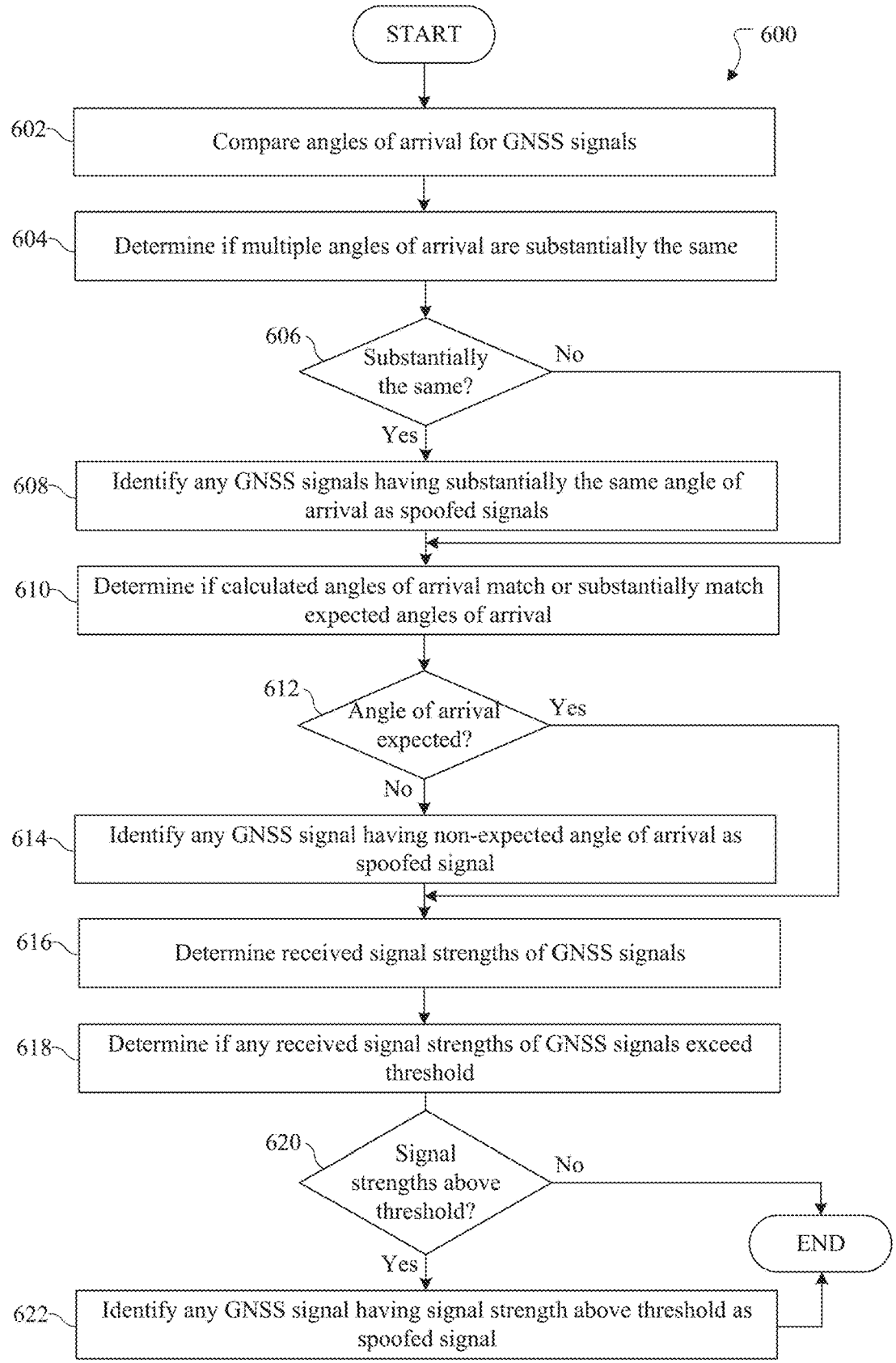
FIG. 6 illustrates an example method for analyzing signals to support GNSS anti-spoofing according to this disclosure.

FIG. 6 illustrates an example method 600 for analyzing signals to support GNSS anti-spoofing according to this disclosure. More specifically, the method 600 shown in FIG. 6 may be performed during step 406 in the method 400 of FIG. 4 to process the determined angles of arrival for GNSS signals. For ease of explanation, the method 600 of FIG. 6 is described as involving the use of the device 200 of FIG. 2 in the GNSS 100 of FIG. 1. However, the method 600 may involve the use of any other suitable device operating in any other suitable system.

As shown in FIG. 6, the angles of arrival for multiple GNSS signals are compared at step 602, and a determination is made if multiple angles of arrival are substantially the same at step 604. This may include, for example, the processor 204 determining if there are multiple calculated angles of arrival within some threshold value of one another, such as about 5° to about 10° (possibly in both azimuth and elevation). If there are multiple angles of arrival that are substantially the same at step 606, the associated GNSS signals are identified as spoofed signals at step 608. This may include, for example, the processor 204 flagging the associated GNSS signals as being invalid, configuring the amplitude and phase adjusters 308 to lower the weights on, discard, block, or otherwise suppress the associated GNSS signals, or configuring the combiner 310 to omit the associated GNSS signals from its combined output.

A determination is made if any angles of arrival match or substantially match expected angles of arrival at step 610. This may include, for example, the processor 204 determining if there are any calculated angles of arrival that do not match expected angles of arrival. As a particular example, this may include the processor 204 determining if a calculated angle of arrival is at or close to the horizon or if a calculated angle of arrival does not match with any expected locations of the GNSS satellites 102 (based on an almanac or ephemerides). Again, the comparison of the calculated and expected angles of arrival can be based on some threshold value, such as about 5° to about 10° (possibly in both azimuth and elevation). If there are any angles of arrival that do not match expected angles of arrival at step 612, the associated GNSS signal or signals are identified as spoofed signals at step 614. Again, this may include the processor 204 flagging the associated GNSS signals as being invalid, configuring the amplitude and phase adjusters 308 to lower the weights on, discard, block, or otherwise suppress the associated GNSS signals, or configuring the combiner 310 to omit the associated GNSS signals from its combined output.

Received signal strengths of the GNSS signals are determined at step 616, and a determination is made if any GNSS signal has a signal strength above some threshold value at step 618. This may include, for example, the processor 204 measuring the received signal strengths or receiving measured signal strengths from the channel receivers 304. This may also include the processor 204 comparing the received signal strengths to a suitable threshold value, such as −120 dBm or lower. If there are any received signal strengths that exceed the threshold at step 620, the associated GNSS signal or signals are identified as spoofed signals at step 622. Again, this may include the processor 204 flagging the associated GNSS signals as being invalid, configuring the amplitude and phase adjusters 308 to lower the weights on, discard, block, or otherwise suppress the associated GNSS signals, or configuring the combiner 310 to omit the associated GNSS signals from its combined output.

Although FIG. 6 illustrates one example of a method 600 for analyzing signals to support GNSS anti-spoofing, various changes may be made to FIG. 6. For example, while shown as a series of steps, various steps in FIG. 6 may overlap, occur in parallel, or occur any number of times. As a particular example, the different tests of the GNSS signals may occur in parallel. Also, the angles of arrival or other characteristics of the received GNSS signals may be used in any other or additional manner to identify spoofed GNSS signals.

Note that in the discussions above, it is often assumed that an individual GNSS signal or a group of GNSS signals can be discarded, blocked, or otherwise suppressed based on an analysis of the information associated with that GNSS signal or that group of GNSS signals. However, it is also possible to discard, block, or otherwise suppress at least one GNSS signal based on an analysis of information associated with other GNSS signals. For example, a determination may be made that a particular pair of GNSS signals were received at substantially the same angle of arrival or that a particular GNSS signal was received from an unexpected direction or has an unacceptably-high signal strength, causing that particular GNSS signal or pair of GNSS signals to be tagged as being spoofed. At that point, it may be assumed that any other GNSS signals having the same or substantially the same angle of arrival may also be spoofed, so those other GNSS signals may be tagged as being spoofed. This approach may be acceptable, for example, if there are an adequate number of GNSS signals that are received at other angles of arrival and determined to be legitimate. Note, however, that this is not required and that GNSS signals may be analyzed even if received at the same or substantially the same angle of arrival as a spoofed GNSS signal.

The GNSS anti-spoofing functionality described above can be used in various ways and in various applications or environments. For example, the GNSS anti-spoofing functionality may be used in civilian or military land vehicles, water vessels, or flight vehicles to ensure that the locations of the vehicles or vessels can be accurately determined. This may be important in various scenarios, such as to ensure that land vehicles, water vessels, or flight vehicles do not cross borders or otherwise enter restricted areas. Similarly, the GNSS anti-spoofing functionality may be used in civilian or military handheld devices to ensure that the locations of the handheld devices can be accurately determined. In addition, the GNSS anti-spoofing functionality may be used in autonomous vehicles to help ensure that accurate positions of the vehicles can be determined in order to improve the safety of the vehicles, which is increasingly becoming a concern (particularly for land-based autonomous passenger vehicles). While the following describes one specific application for the GNSS anti-spoofing functionality, this functionality may be used in any other suitable manner.

Figure 7:
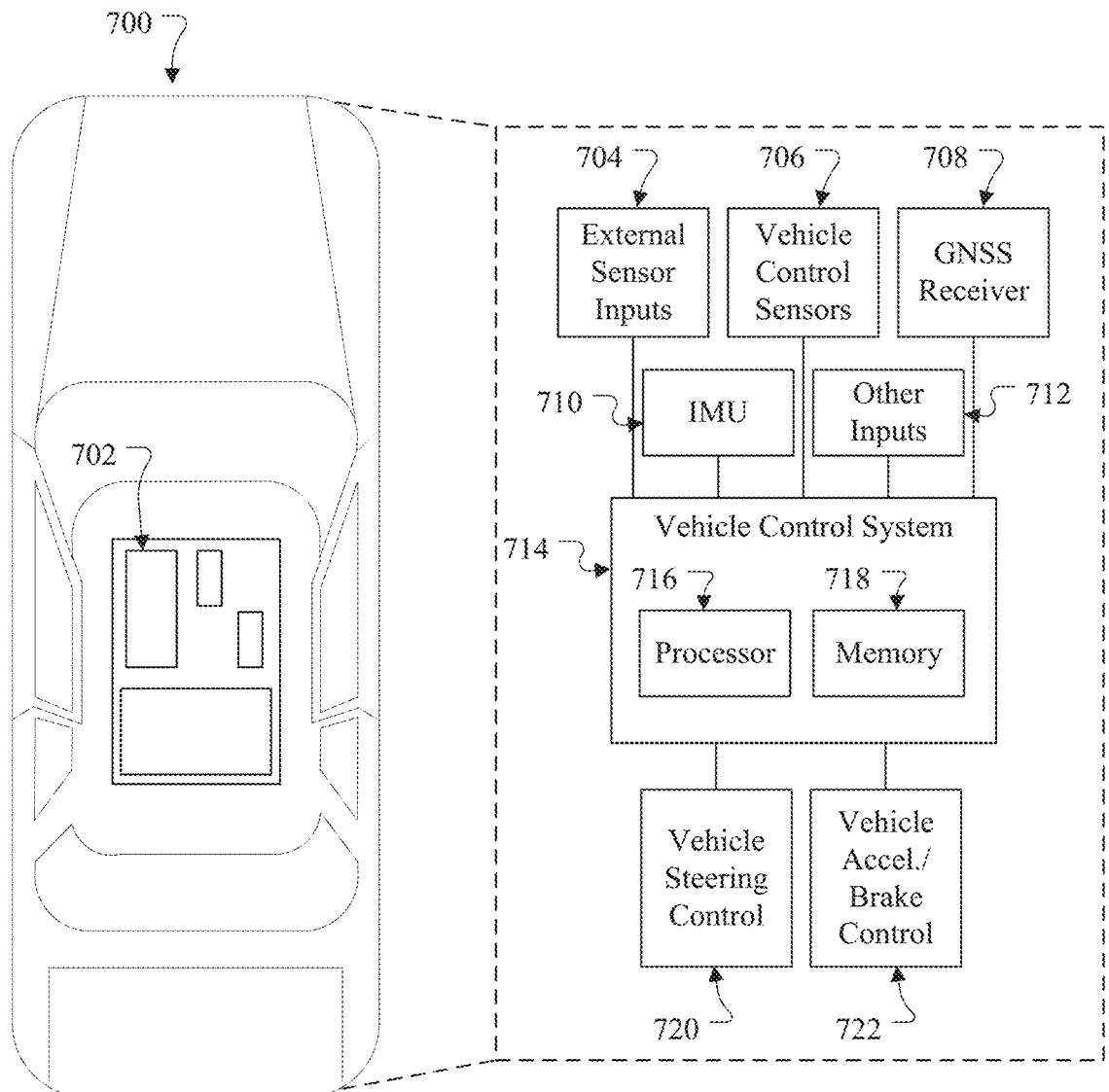
FIG. 7 illustrates an example autonomous vehicle supporting GNSS anti-spoofing according to this disclosure.

FIG. 7 illustrates an example autonomous vehicle 700 supporting GNSS anti-spoofing according to this disclosure. In this example, the autonomous vehicle 700 here has the form of a passenger car, such as a sedan or other smaller passenger vehicle. However, the autonomous vehicle 700 may represent any other suitable type of passenger vehicle or other autonomous vehicle. Other types of vehicles that may be used here include sport utility vehicles (SUVs), pickup trucks, semi-trucks (tractor-trailers), autonomous shuttles or autonomous buses (such as those used in theme parks, airports, retirement communities, or other locations), or autonomous underwater vehicles or autonomous flight vehicles that may use GNSS-based navigation in some manner.

As shown in FIG. 7, the autonomous vehicle 700 may include one or more externally-mounted sensors 702. There are various types of externally-mounted sensors 702 known in the field of autonomous driving, and various other types of externally-mounted sensors 702 are sure to be developed in the future. Some example types of externally-mounted sensors 702 include visible cameras, infrared/thermal cameras, radio detection and ranging (RADAR) systems, light detection and ranging (LiDAR) systems, and ultrasonic sensors. In this example, multiple externally-mounted sensors 702 are mounted to the roof of the autonomous vehicle 700, although each of the externally-mounted sensors 702 may be mounted in any suitable location on the vehicle 700. In many instances, some or all of the externally-mounted sensors 702 for an autonomous vehicle 700 can be packaged into a single structure that is mounted to the roof of the vehicle 700, although this is not required.

The autonomous vehicle 700 also includes various additional components within the vehicle 700 itself. For example, the autonomous vehicle 700 here includes various sources of input data for use in controlling the operation of the vehicle 700. In this particular example, the sources of input data include one or more external sensor inputs 704, which are configured to be coupled to the externally-mounted sensors 702 and to receive input data from the externally-mounted sensors 702. The sources of input data also include one or more vehicle control sensors 706, which can measure and provide various data about controls of the autonomous vehicle 700. For instance, the vehicle control sensors 706 may measure and provide the current positions of the steering wheel, gear shift, brake pedal, and gas pedal (accelerator) of the vehicle 700. The sources of input data further include a GNSS receiver 708 (such as a GPS receiver), which can be used to identify the geo-spatial location of the vehicle 700. In addition, the sources of input data include an inertial measurement unit (IMU) 710, which often includes one or more gyroscopes or one or more accelerometers. Any other or additional sources 712 of input data can also be used in the vehicle 700.

The various input data is provided to a vehicle control system 714, which uses the input data to determine how to control the autonomous vehicle 700. For example, the vehicle control system 714 may use input data from the externally-mounted sensors 702 to identify information about the vehicle's surroundings and any obstacles that might be detected in the travel path of the vehicle 700. The vehicle control system 714 may use input data from the vehicle control sensors 706 to determine how much the control system 714 is able to adjust the steering wheel, gear shift, brake pedal, and gas pedal positions, to confirm whether certain actions initiated by the vehicle control system 714 have been performed, and to detect if a driver of the vehicle 700 is attempting to take control of the vehicle 700. The vehicle control system 714 may use input data from the GNSS receiver 708 to identify the current position of the vehicle 700 on a map for one or more occupants, to determine the best route to take in order to reach a desired destination, or to cause the vehicle 700 to follow a pre-programmed course. The vehicle control system 714 may use input data from the IMU 710 to sense roll-overs or other accidents, to sense how quickly the vehicle 700 accelerates or decelerates, or to supplement position data from the GNSS receiver 708 when the GNSS receiver 708 temporarily loses the ability to receive position signals (which is often referred to as "dead reckoning capability"). Note, however, that these uses for input data are examples only and that the vehicle control system 714 can use input data in any suitable manner to perform any desired functions.

The vehicle control system 714 in this example includes at least one processor 716 and at least one memory 718. The at least one processor 716 processes the various input data in order to determine how to control the operation of the autonomous vehicle 700. The at least one memory 718 can store and facilitate retrieval of the data used by the processor 716. The at least one memory 718 may also store instructions executed by the processor 716.

The vehicle control system 714 interacts with various actuators or other individual control systems to control various aspects of the vehicle's operation. For example, the vehicle control system 714 may be used to control a vehicle steering control system 720, which controls the turning of the steering wheel of the vehicle 700. As another example, the vehicle control system 714 may be used to control a vehicle acceleration/braking control system 722, which controls the brake pedal and the gas pedal of the vehicle 700 to control acceleration and deceleration of the vehicle 700. Note, however, that the vehicle control system 714 can be used to control any other suitable operations of the vehicle 700, such as by interacting with other subsystems to control use of the vehicle's headlights, turn signals, windshield wipers, or other components of the vehicle 700.

The autonomous vehicle 700 here can include or support the GNSS anti-spoofing functionality described above. For example, the GNSS receiver 708 may be implemented using the device 200 shown in FIG. 2 and described above (along with the related functionality described above with respect to other figures). Note that the processor 204 and memory 208 may be implemented separate from the processor 716 and memory 718 of the vehicle control system 714, although this is not required. The ability to combat GNSS spoofing allows the autonomous vehicle 700 to operate in a safer and more reliable manner. For instance, the use of the GNSS anti-spoofing functionality described above may help to prevent an illicit actor from spoofing GNSS signals to misdirect the autonomous vehicle 700 to an undesired location. The use of the GNSS anti-spoofing functionality described above may also help to prevent an illicit actor from spoofing GNSS signals to cause erratic behavior of an autonomous vehicle 700, such as when GNSS signals are spoofed to try and cause the vehicle 700 to make course corrections based on an incorrect current location of the vehicle 700.

Although FIG. 7 illustrates one example of an autonomous vehicle 700 supporting GNSS anti-spoofing, various changes may be made to FIG. 7. For example, any suitable vehicle having any suitable form may be used with GNSS anti-spoofing. Also, the autonomous vehicle 700 may include any suitable sensors or other sources of input data used to control any suitable aspects of the autonomous vehicle 700.

Figure 8:
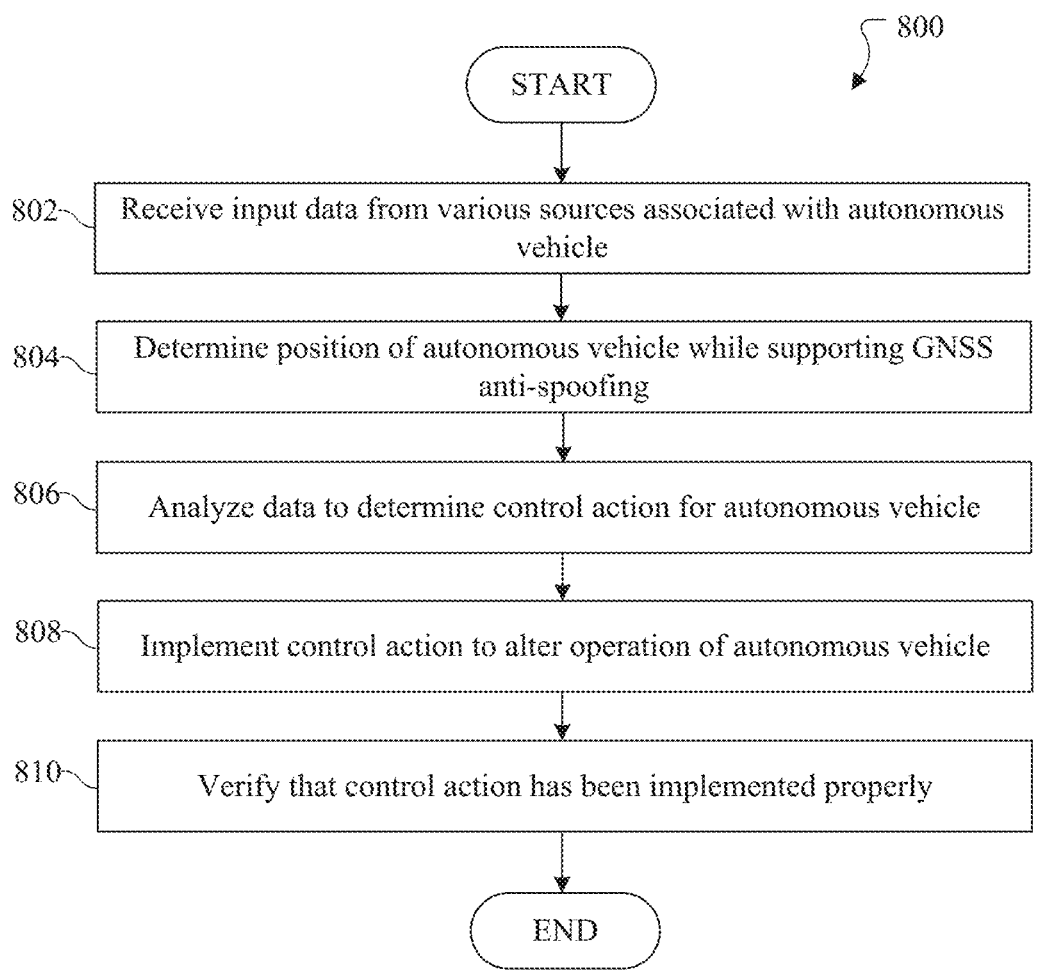
FIG. 8 illustrates an example method for using GNSS anti-spoofing in an autonomous vehicle according to this disclosure.

FIG. 8 illustrates an example method 800 for using GNSS anti-spoofing in an autonomous vehicle according to this disclosure. For ease of explanation, the method 800 of FIG. 8 is described as involving the device 200 of FIG. 2 in the autonomous vehicle 700 of FIG. 7. However, the method 800 may involve the use of any suitable GNSS-based device or system operating in any suitable autonomous vehicle.

As shown in FIG. 8, input data is received from various sources associated with an autonomous vehicle at step 802. This may include, for example, the vehicle control system 714 of the autonomous vehicle 700 receiving input data from sources like externally-mounted sensors 702 (via external sensor inputs 704), vehicle control sensors 706, or an IMU 710.

A position of the autonomous vehicle is determined while supporting GNSS anti-spoofing at step 804. This may include, for example, the GNSS receiver 708 using the techniques discussed above to identify legitimate GNSS signals while discarding, blocking, or otherwise suppressing spoofed GNSS signals. This may also include the GNSS receiver 708 using the legitimate GNSS signals to identify the geo-spatial location of the autonomous vehicle 700. This may further include the GNSS receiver 708 providing the determined location to the vehicle control system 714. As noted above, however, there may be instances where the vehicle control system 714 determines its own location based on received GNSS signals without the need for a separate GNSS receiver 708.

The various data is analyzed to identify at least one control action for the autonomous vehicle at step 806. This may include, for example, the processor 716 of the vehicle control system 714 analyzing the various input data to determine whether to cause the autonomous vehicle 700 to turn, accelerate, decelerate, or perform some other function. This may also include the processor 716 of the vehicle control system 714 using the identified location of the autonomous vehicle 700 in some way, such as to verify whether the autonomous vehicle 700 is following a desired route or to calculate a new route to a desired destination. The at least one control action is implemented at step 808, and a verification that the at least one control action was actually implemented is made at step 810. This may include, for example, the processor 716 of the vehicle control system 714 outputting control signals or other commands to the vehicle steering control system 720, vehicle acceleration/braking control system 722, or other subsystem or subsystems of the autonomous vehicle 700. This may also include the processor 716 of the vehicle control system 714 using additional input data from one or more sensors or other components to verify that the desired control action or actions have been performed correctly.

Although FIG. 8 illustrates one example of a method 800 for using GNSS anti-spoofing in an autonomous vehicle, various changes may be made to FIG. 8. For example, while shown as a series of steps, various steps in FIG. 8 may overlap, occur in parallel, or occur any number of times. Also, it should be noted that different control actions may or may not involve the use of the location of the autonomous vehicle 700.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable storage device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed.

For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims includes means-plus-function elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves and is not intended to represent means-plus-function elements.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the scope of this disclosure, as defined by the following claims.

What is claimed is:

1. A system comprising:
a vehicle;
a vehicle control system configured to autonomously control one or more operations of the vehicle; and
a navigation receiver configured to identify a location of the vehicle and to provide the identified location to the vehicle control system;
wherein the navigation receiver comprises:
a multi-element antenna comprising a plurality of antenna elements;
a plurality of channel receivers, each antenna element of the plurality of antenna elements electrically coupled to a different channel receiver of the plurality of channel receivers, the plurality of channel receivers configured to pre-process a plurality of navigation signals received by the antenna elements;
a plurality of phase detectors electrically coupled to the plurality of channel receivers and configured to identify phases of the plurality of navigation signals;
a plurality of amplitude and phase adjusters electrically coupled to the plurality of phase detectors;
at least one processor electrically coupled to the plurality of phase detectors and to the plurality of amplitude and phase adjusters; and
at least one memory coupled to the at least one processor;
wherein, to identify the location of the vehicle, the at least one processor of the navigation receiver is configured to:
receive information about expected or actual positions of a plurality of satellites associated with the navigation signals, the information about the expected or actual positions of the plurality of satellites comprising a navigation almanac stored in the at least one memory;
determine an angle of arrival for each of the navigation signals by analyzing the identified phases from the phase detectors to identify a time difference of arrival for each of the navigation signals;
identify whether any of the navigation signals received by the navigation receiver are spoofed based on the angles of arrival for the navigation signals; and
suppress any of the navigation signals determined to be spoofed;
wherein, to identify whether any of the navigation signals are spoofed, the at least one processor is configured to:
determine whether more than two of the navigation signals were received at substantially the same angle of arrival;
in response to determining that the more than two navigation signals were received at substantially the same angle of arrival, determine that the more than two navigation signals are spoofed;
compare the angles of arrival for the navigation signals to at least one expected angle of arrival, wherein the at least one expected angle of arrival is at least one of: (i) above a horizon or (ii) based on the information about the expected or actual positions of the plurality of satellites stored in the at least one memory;
determine whether at least one of the navigation signals was received at an angle of arrival different from the at least one expected angle of arrival; and
in response to determining that the at least one navigation signal was received at an angle of arrival different from the at least one expected angle of arrival, determine that the at least one navigation signal is spoofed; and
wherein, to suppress any of the navigation signals determined to be spoofed, the at least one processor is configured to control the plurality of amplitude and phase adjusters to weight the plurality of navigation signals from different channel receivers.

2. The system of claim 1, wherein the vehicle control system is further configured to at least one of:
use the identified location of the vehicle to calculate a route to a desired destination; and
use the identified location of the vehicle to verify whether the vehicle is following a desired route.

3. The system of claim 1, wherein the navigation receiver is configured to suppress any of the navigation signals determined to be spoofed in order to prevent an illicit actor from misdirecting the vehicle to an undesired location.

4. The system of claim 1, wherein the navigation receiver is configured to suppress any of the navigation signals determined to be spoofed in order to prevent an illicit actor from causing the vehicle to make course corrections based on an incorrect current location of the vehicle.

5. The system of claim 1, wherein the one or more operations of the vehicle comprise turning the vehicle, accelerating, and decelerating.

6. The system of claim 1, wherein:
the at least one processor of the navigation receiver comprises at least one first processor configured to identify whether any of the navigation signals are spoofed and to control suppression of any of the navigation signals determined to be spoofed; and
the vehicle control system comprises at least one second processor configured to autonomously control the one or more operations of the vehicle.

7. The system of claim 1, wherein the vehicle control system is configured to autonomously control at least one of the one or more operations of the vehicle based on the identified location of the vehicle.

8. An apparatus comprising:
a navigation receiver configured to identify a location of a vehicle and to output the identified location;
wherein the navigation receiver comprises:
- a multi-element antenna comprising a plurality of antenna elements;
- a plurality of channel receivers, each antenna element of the plurality of antenna elements electrically coupled to a different channel receiver of the plurality of channel receivers, the plurality of channel receivers configured to pre-process a plurality of navigation signals received by the antenna elements;
- a plurality of phase detectors electrically coupled to the plurality of channel receivers and configured to identify phases of the plurality of navigation signals;
- a plurality of amplitude and phase adjusters electrically coupled to the plurality of phase detectors;
- at least one processor electrically coupled to the plurality of phase detectors and to the plurality of amplitude and phase adjusters; and
- at least one memory coupled to the at least one processor;

wherein the at least one processor is configured to:
receive information about expected or actual positions of a plurality of satellites associated with the navigation signals, the information about the expected or actual positions of the plurality of satellites comprising a navigation almanac stored in the at least one memory;
determine an angle of arrival for each of the navigation signals by analyzing the identified phases from the phase detectors to identify a time difference of arrival for each of the navigation signals;
identify whether any of the navigation signals received by the navigation receiver are spoofed based on the angles of arrival for the navigation signals; and
suppress any of the navigation signals determined to be spoofed;

wherein, to identify whether any of the navigation signals are spoofed, the at least one processor is configured to:
determine whether more than two of the navigation signals were received at substantially the same angle of arrival;
in response to determining that the more than two navigation signals were received at substantially the same angle of arrival, determine that the more than two navigation signals are spoofed;
compare the angles of arrival for the navigation signals to at least one expected angle of arrival, wherein the at least one expected angle of arrival is at least one of: (i) above a horizon or (ii) based on the information about the expected or actual positions of the plurality of satellites stored in the at least one memory;
determine whether at least one of the navigation signals was received at an angle of arrival different from the at least one expected angle of arrival; and
in response to determining that the at least one navigation signal was received at an angle of arrival different from the at least one expected angle of arrival, determine that the at least one navigation signal is spoofed; and wherein, to suppress any of the navigation signals determined to be spoofed, the at least one processor is configured to control the plurality of amplitude and phase adjusters to weight the plurality of navigation signals from different channel receivers.

9. The apparatus of claim 8, wherein the navigation receiver is configured to suppress any of the navigation signals determined to be spoofed in order to prevent an illicit actor from misdirecting the vehicle to an undesired location.

10. The apparatus of claim 8, wherein the navigation receiver is configured to suppress any of the navigation signals determined to be spoofed in order to prevent an illicit actor from causing the vehicle to make course corrections based on an incorrect current location of the vehicle.

11. The apparatus of claim 8, wherein the navigation receiver is configured to identify the location of the vehicle using any of the navigation signals determined not to be spoofed.

12. The apparatus of claim 8, wherein the navigation receiver comprises a global navigation satellite system (GNSS) receiver.

13. A method comprising:
identifying a location of a vehicle using a navigation receiver, wherein the navigation receiver comprises:
- a multi-element antenna comprising a plurality of antenna elements;
- a plurality of channel receivers, each antenna element of the plurality of antenna elements electrically coupled to a different channel receiver of the plurality of channel receivers, the plurality of channel receivers configured to pre-process a plurality of navigation signals received by the antenna elements;
- a plurality of phase detectors electrically coupled to the plurality of channel receivers and configured to identify phases of the plurality of navigation signals;
- a plurality of amplitude and phase adjusters electrically coupled to the plurality of phase detectors;
- at least one processor electrically coupled to the plurality of phase detectors and to the plurality of amplitude and phase adjusters; and
- at least one memory coupled to the at least one processor;

providing the identified location to a vehicle control system of the vehicle; and
autonomously controlling one or more operations of the vehicle using the vehicle control system;

wherein identifying the location of the vehicle comprises:
receiving, by the navigation receiver, information about expected or actual positions of a plurality of satellites associated with the navigation signals, the information about the expected or actual positions of the plurality of satellites comprising a navigation almanac stored in the at least one memory;
determining, by the navigation receiver, an angle of arrival for each of the navigation signals by analyzing the identified phases from the phase detectors to identify a time difference of arrival for each of the navigation signals;
identifying whether any of the navigation signals received by the navigation receiver are spoofed based on the angles of arrival for the navigation signals; and
suppressing any of the navigation signals determined to be spoofed;

wherein identifying whether any of the navigation signals are spoofed comprises:
determining, by the navigation receiver, whether more than two of the navigation signals were received at substantially the same angle of arrival;
in response to determining that the more than two navigation signals were received at substantially the same angle of arrival, determining that the more than two navigation signals are spoofed;

comparing, by the navigation receiver, the angles of arrival for the navigation signals to at least one expected angle of arrival, wherein the at least one expected angle of arrival is at least one of: (i) above a horizon or (ii) based on the information about the expected or actual positions of the plurality of satellites stored in the at least one memory;

determining, by the navigation receiver, whether at least one of the navigation signals was received at an angle of arrival different from the at least one expected angle of arrival; and in response to determining that the at least one navigation signal was received at an angle of arrival different from the at least one expected angle of arrival, determining that the at least one navigation signal is spoofed; and wherein suppressing any of the navigation signals determined to be spoofed comprises controlling the plurality of amplitude and phase adjusters to weight the plurality of navigation signals from different channel receivers.

14. The method of claim 13, further comprising at least one of:

using the identified location of the vehicle to verify whether the vehicle is following a desired route; and using the identified location of the vehicle to calculate a route to a desired destination.

15. The method of claim 13, wherein suppressing any of the navigation signals determined to be spoofed prevents an illicit actor from misdirecting the vehicle to an undesired location.

16. The method of claim 13, wherein suppressing any of the navigation signals determined to be spoofed prevents an illicit actor from causing the vehicle to make course corrections based on an incorrect current location of the vehicle.

17. The method of claim 13, wherein the one or more operations of the vehicle comprise turning the vehicle, accelerating, and decelerating.

18. The method of claim 13, wherein:

the at least one processor of the navigation receiver comprises at least one first processor configured to identify whether any of the navigation signals are spoofed and to control suppression of any of the navigation signals determined to be spoofed; and the vehicle control system comprises at least one second processor configured to autonomously control the one or more operations of the vehicle.

19. The method of claim 13, wherein at least one of the one or more operations of the vehicle is controlled based on the identified location of the vehicle.

20. The apparatus of claim 8, further comprising a vehicle control system configured to at least one of:

use the identified location of the vehicle to calculate a route to a desired destination; and use the identified location of the vehicle to verify whether the vehicle is following a desired route.

* * * * *